United States Patent [19]
Noda et al.

[11] Patent Number: 5,372,545
[45] Date of Patent: Dec. 13, 1994

[54] VENTILATOR WITH A SENSOR

[75] Inventors: Etsuji Noda, Gifu; Hiroshi Usami; Yoshiki Hashimoto, both of Aichi, all of Japan

[73] Assignee: Kabushiki Kaisha Toshiba, Kawasaki, Japan

[21] Appl. No.: 66,426

[22] Filed: May 25, 1993

[30] Foreign Application Priority Data

May 25, 1992 [JP] Japan .................. 4-132744

[51] Int. Cl.⁵ .............................. F24F 11/00
[52] U.S. Cl. ......................... 454/256; 236/51
[58] Field of Search ............... 236/51; 454/229, 256, 454/338

[56] References Cited
U.S. PATENT DOCUMENTS 4,448,035 5/1984 Moriyama et al. ............... 62/176.6
4,868,390 9/1989 Keller et al. ..................... 250/338.3
5,163,234 11/1992 Tsukamoto et al. .................. 34/44

FOREIGN PATENT DOCUMENTS

| 23045 | 1/1989 | Japan ................. 454/229 |
| 2-223747 | 9/1990 | Japan . |
| 3-7835 | 1/1991 | Japan . |
| 31632 | 2/1991 | Japan ................. 454/256 |
| 1519799 | 12/1975 | United Kingdom . |
| 2215092 | 9/1989 | United Kingdom . |

Primary Examiner—Harold Joyce
Attorney, Agent, or Firm—Cushman, Darby & Cushman

[57] ABSTRACT

A ventilator includes a ventilator fan and a sensor which detects a human body without contact. When a user performs the specific action, a comparator compares the action with a pattern stored in a memory. If the action matches the pattern, a controller controls the operation of the ventilator fan.

16 Claims, 18 Drawing Sheets

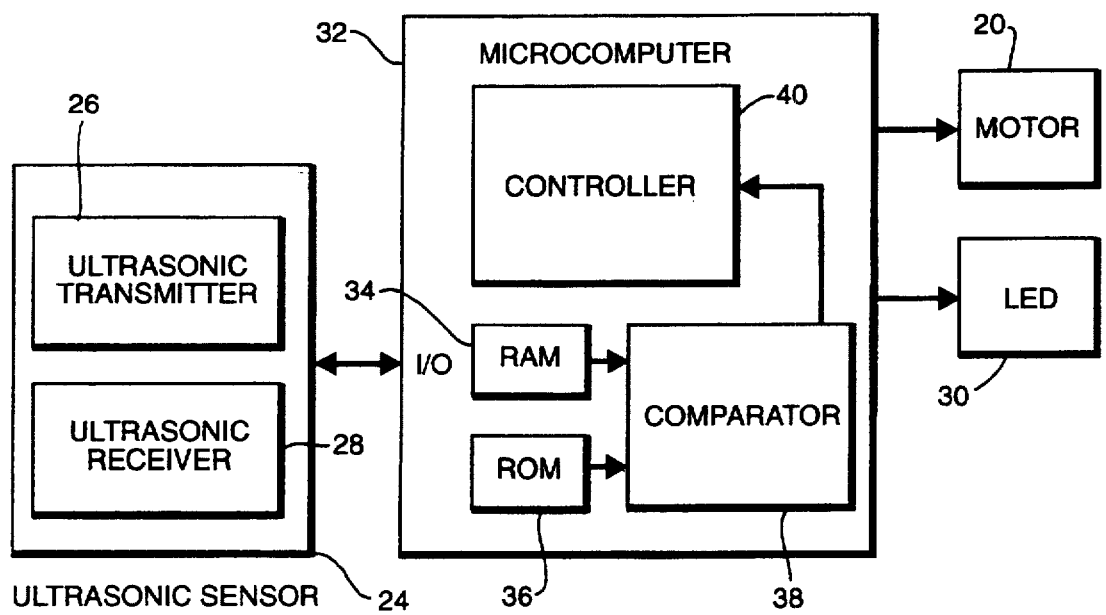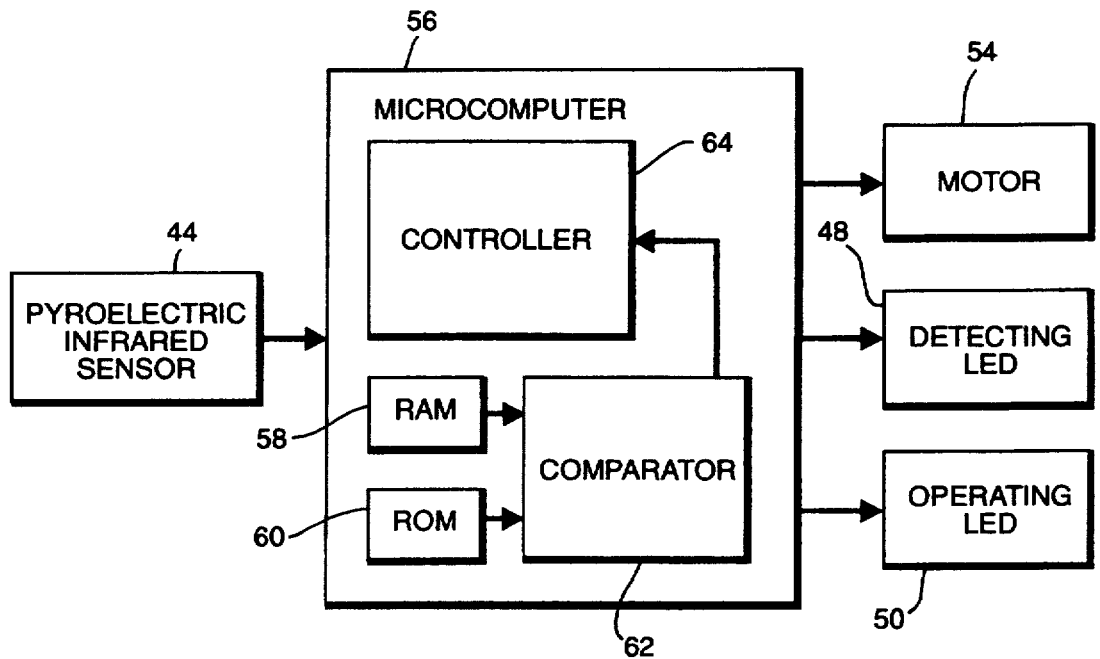

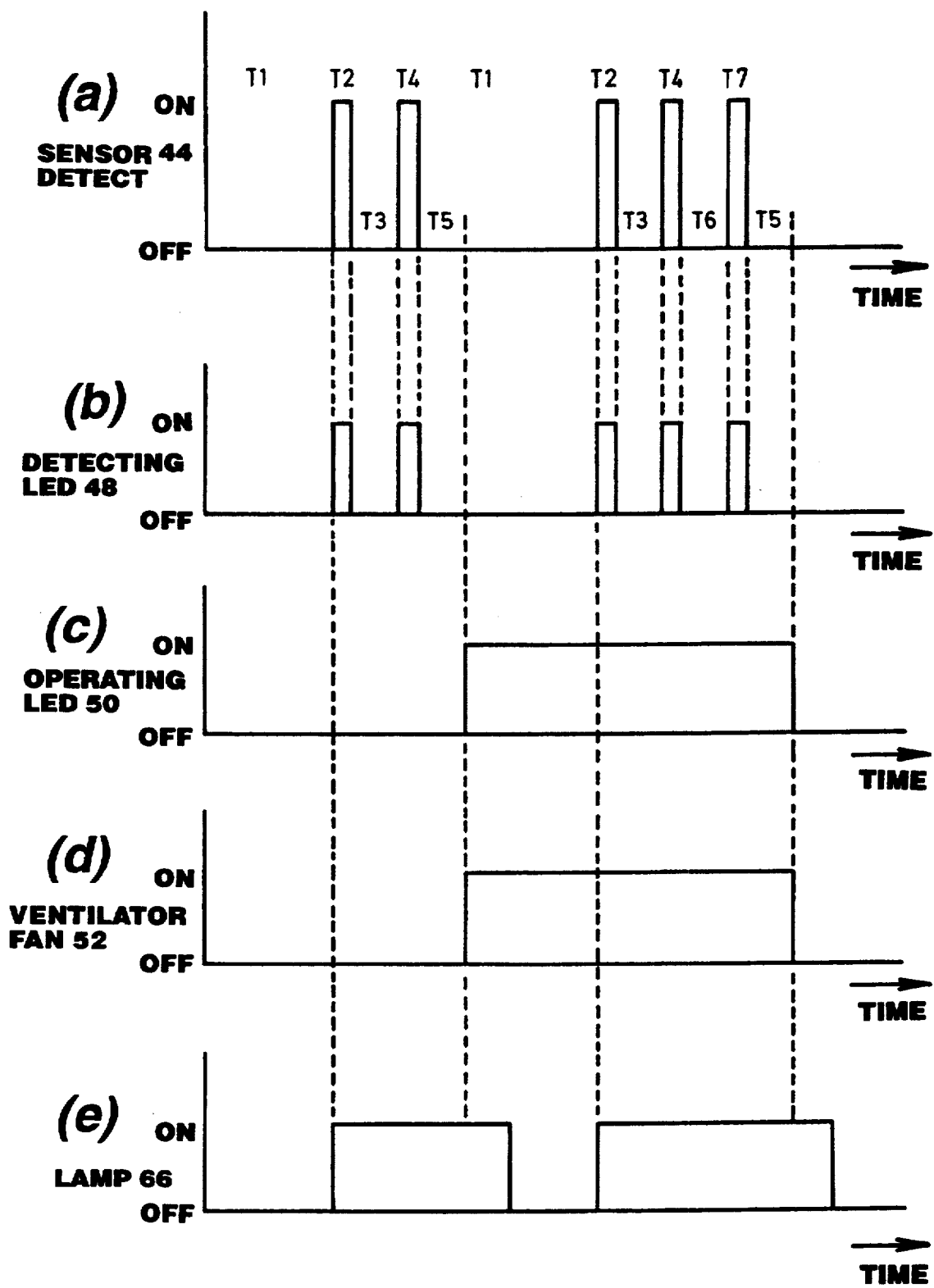

VENTILATOR WITH A SENSOR

BACKGROUND OF THE INVENTION

The present invention relates to a ventilator with a sensor which can detect a human body without contact, for example, a pyroelectric infrared sensor or an ultrasonic sensor.

A prior ventilator has a switch, for example, a string-pull switch, a wall switch mounted on the wall, pyroelectric infrared sensor, or an ultrasonic sensor by which an operation of the ventilator is performed.

In case of using the string-pull switch, since a user has to touch the string-pull switch which is soiled by oil or the like by his hand, the user's hand is soiled by oil attached on the string-pull switch.

In case of using the wall switch, an indoor wiring work is required, and when an interior layout is altered, the wall switch hinders the alteration of the layout.

In case of mere using of the pyroelectric infrared sensor or the ultrasonic sensor, the ventilator runs automatically regardless of the user's desire. In addition, the user cannot control the actuation and the deactuation of the ventilator at will.

SUMMARY OF THE INVENTION

It is an object of the present invention to provide a ventilator which can be controlled without contact according to the user's desire.

In order to achieve the above object of the present invention, there is provided a ventilator comprising:
a) a ventilator fan;
b) detecting means for detecting a motion of a human body without contact;
c) a memory including plural signal patterns, each pattern corresponding to a specific motion of the ventilator fan;
d) comparing means for comparing a pattern of motion detected by the detecting means with the signal patterns stored in the memory and determining which signal pattern corresponds thereto; and
e) control means for controlling the ventilator fan on the basis of the determination of the comparing means.

BRIEF DESCRIPTION OF THE DRAWINGS

In the accompanying drawings:

FIG. 1 is a block diagram of the electrical portion of a first embodiment of this invention;

FIG. 8 is a block diagram of the electrical portion of a second embodiment of this invention;

FIG. 19 is a timing chart explaining operation of the third embodiment of this invention;

DETAILED DESCRIPTION OF THE INVENTION

Figure 2:
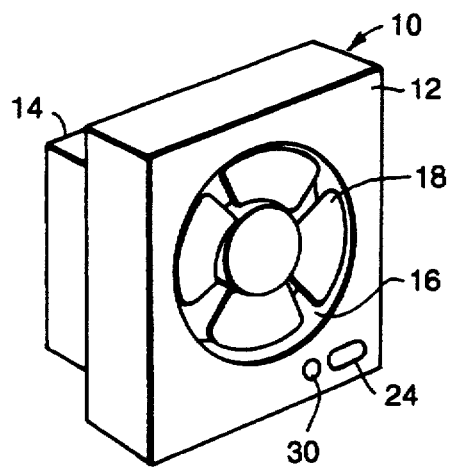
FIG. 2 is a perspective view of a ventilator according to a first embodiment of this invention.
Figure 9:
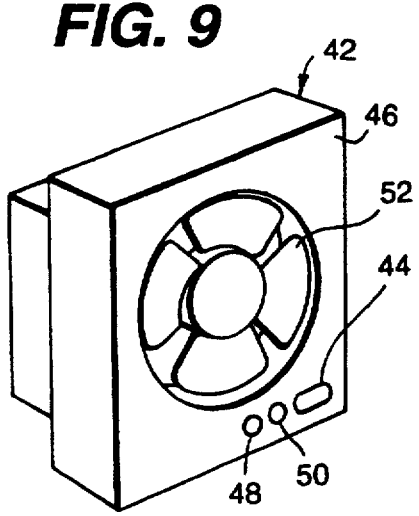
FIG. 9 is a perspective view of a ventilator according to a second embodiment of this invention.

The first embodiment of this invention will be described with reference to FIG. 1 to FIG. 7.

A ventilator 10 has a frame 14 which is to be inserted into a cavity in a wall 13. The frame 14 has a case 12 with a bell mouth 16 opening at a front face of the case. Within the bell mouth 16 a ventilator fan 18 is located concentrically. A motor 20 which rotates the ventilator fan 18 provided in the case 12, is coaxially connected to the ventilator fan by a shaft.

A ultrasonic sensor 24, including an ultrasonic transmitter 26 and an ultrasonic receiver 28, is located on the front lower portion of the case 12. A display, such as for example, an LED 30 is adjacent to the ultrasonic sensor 24. Ultrasonic sensor 24 communicates with a microcomputer 32.

Microcomputer 32 includes a RAM 34, a ROM 36, a comparator 38, and a controller 40. The ROM 36 stores a program, data, based on which the ventilator fan 18 is controlled, and multiple signal patterns, which correspond to specific predetermined motions of the ventilation fan, for example, consisting of a time and a distance as shown in FIG. 4(a). The ultrasonic sensor 24 is connected to an input/output port of the microcomputer 32. Data which the ultrasonic receiver 28 receives are sent to the RAM 34 through the input/output port. The ultrasonic receiver data, stored in the RAM 34, and the signal patterns stored in the ROM 36 are sent to the comparator 38. The comparator 38 compares the ultrasonic receiver data with the signal patterns, and information based on the comparison is sent to the controller 40. The motor 20 and the LED 30 are also connected to the microcomputer 32 respectively, and are controlled by the controller 40 based on the comparison information.

Figure 5A:
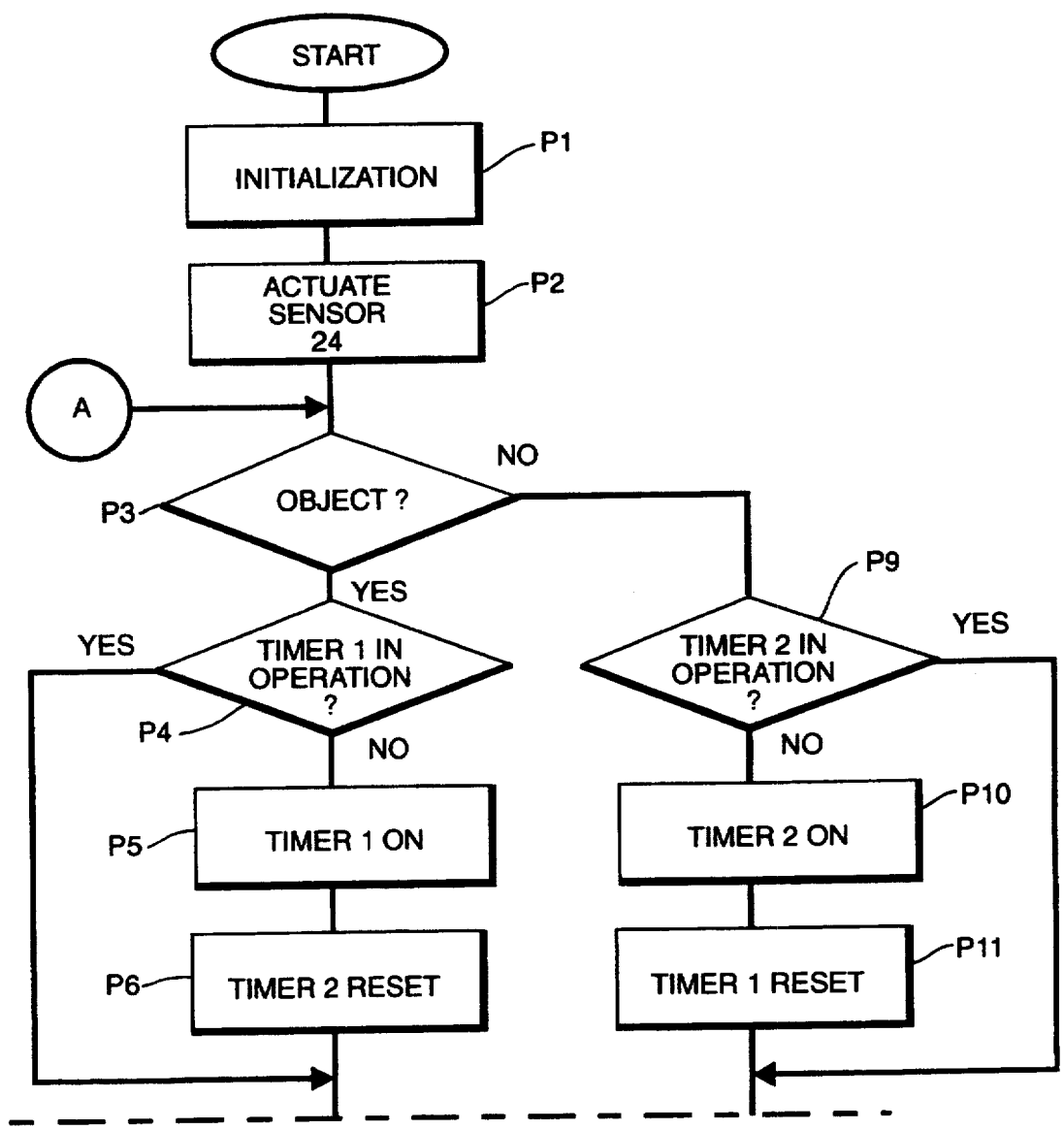
FIG. 5, FIG. 6 and FIG. 7 are flowcharts showing the operation of the first embodiment of this invention.
Figure 5B:
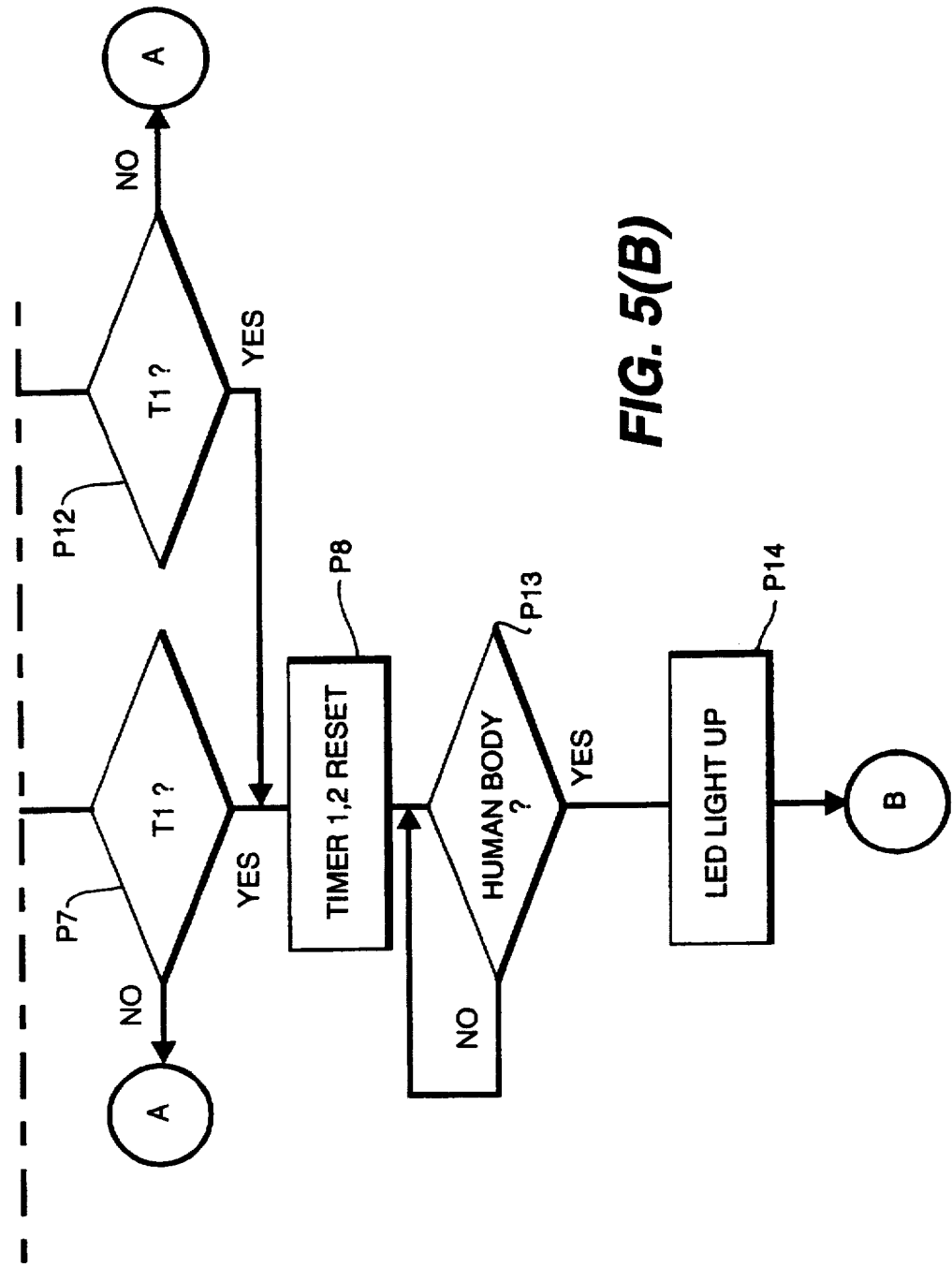
Figure 6A:
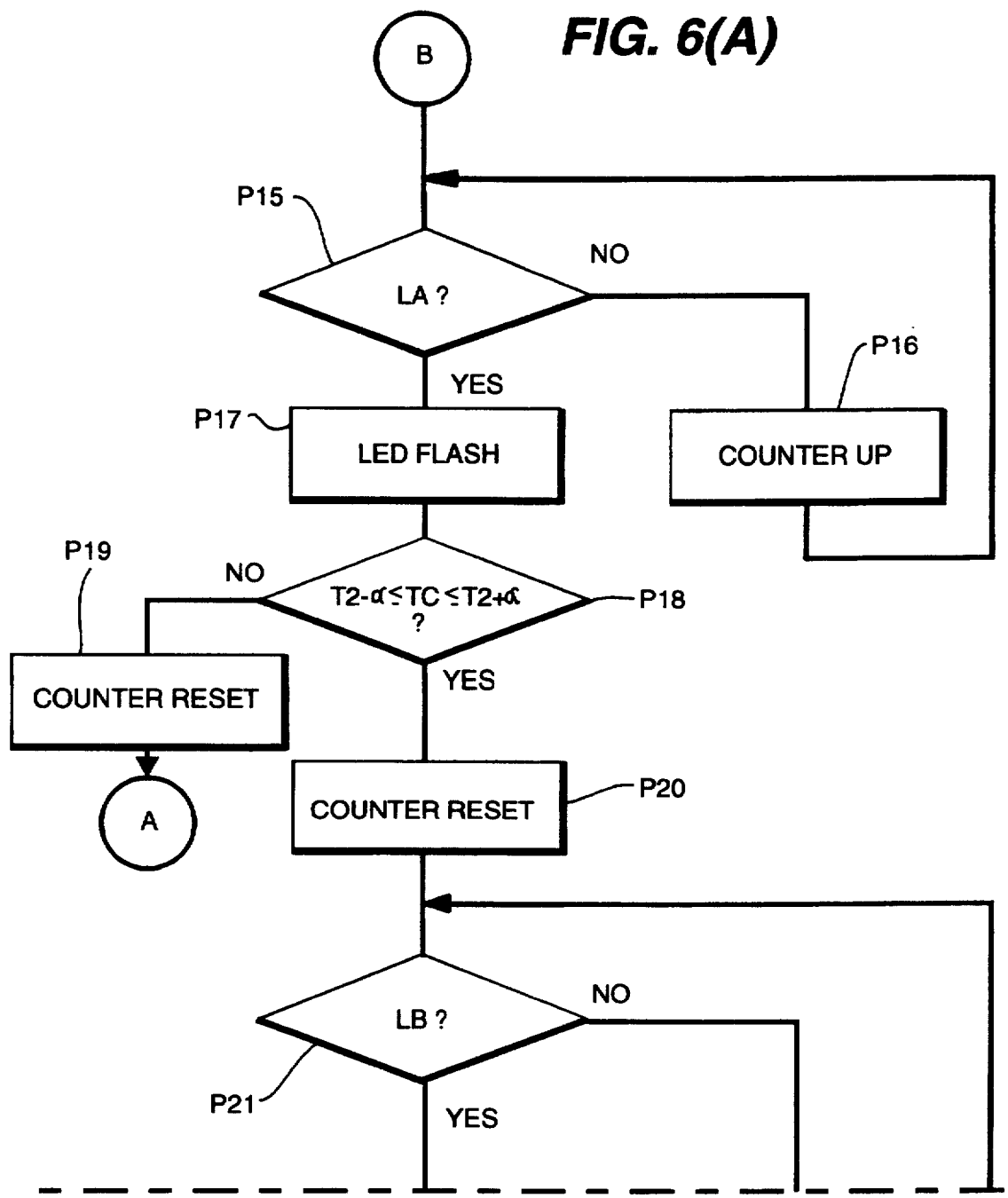
Figure 6B:
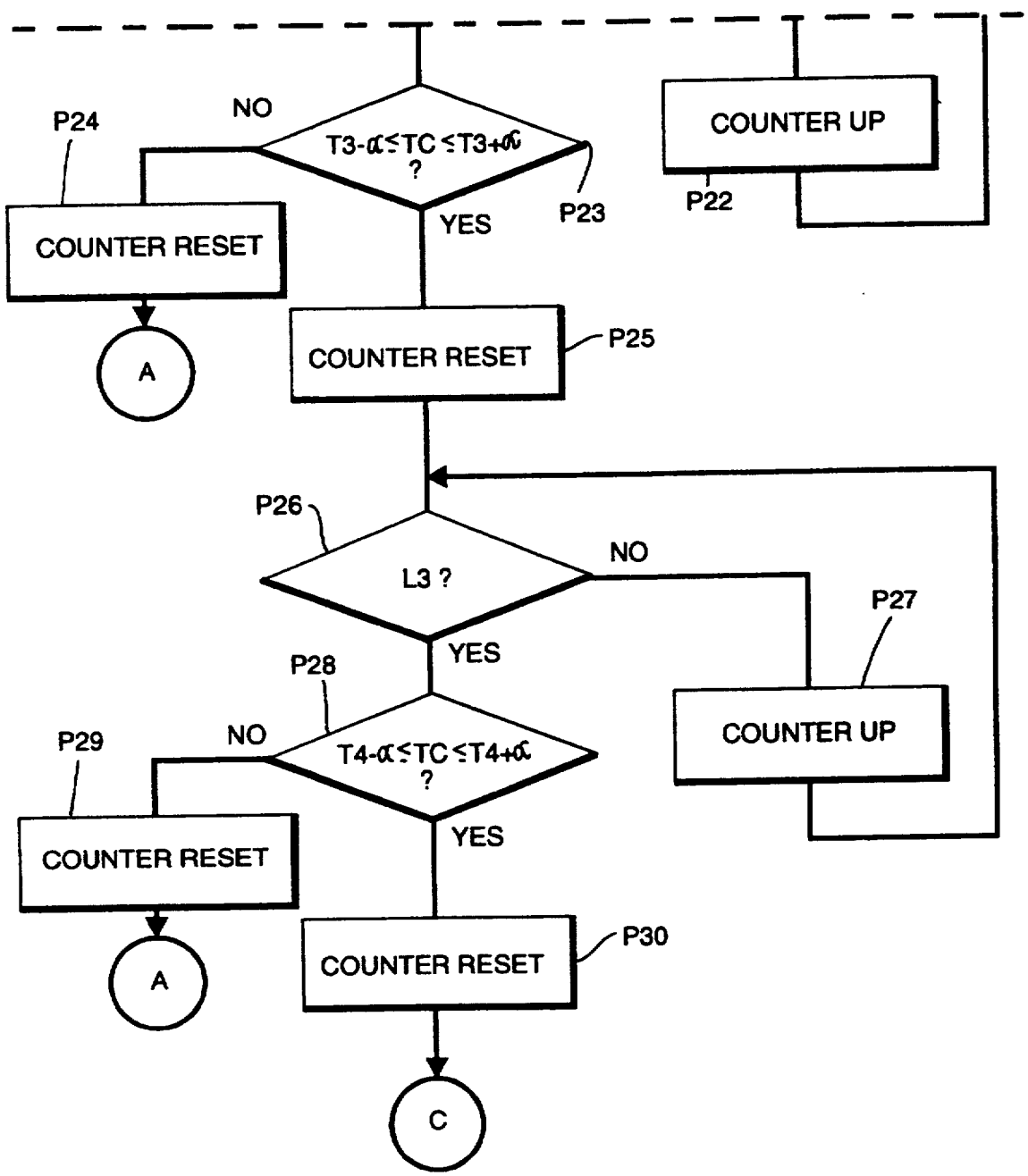
Figure 7:
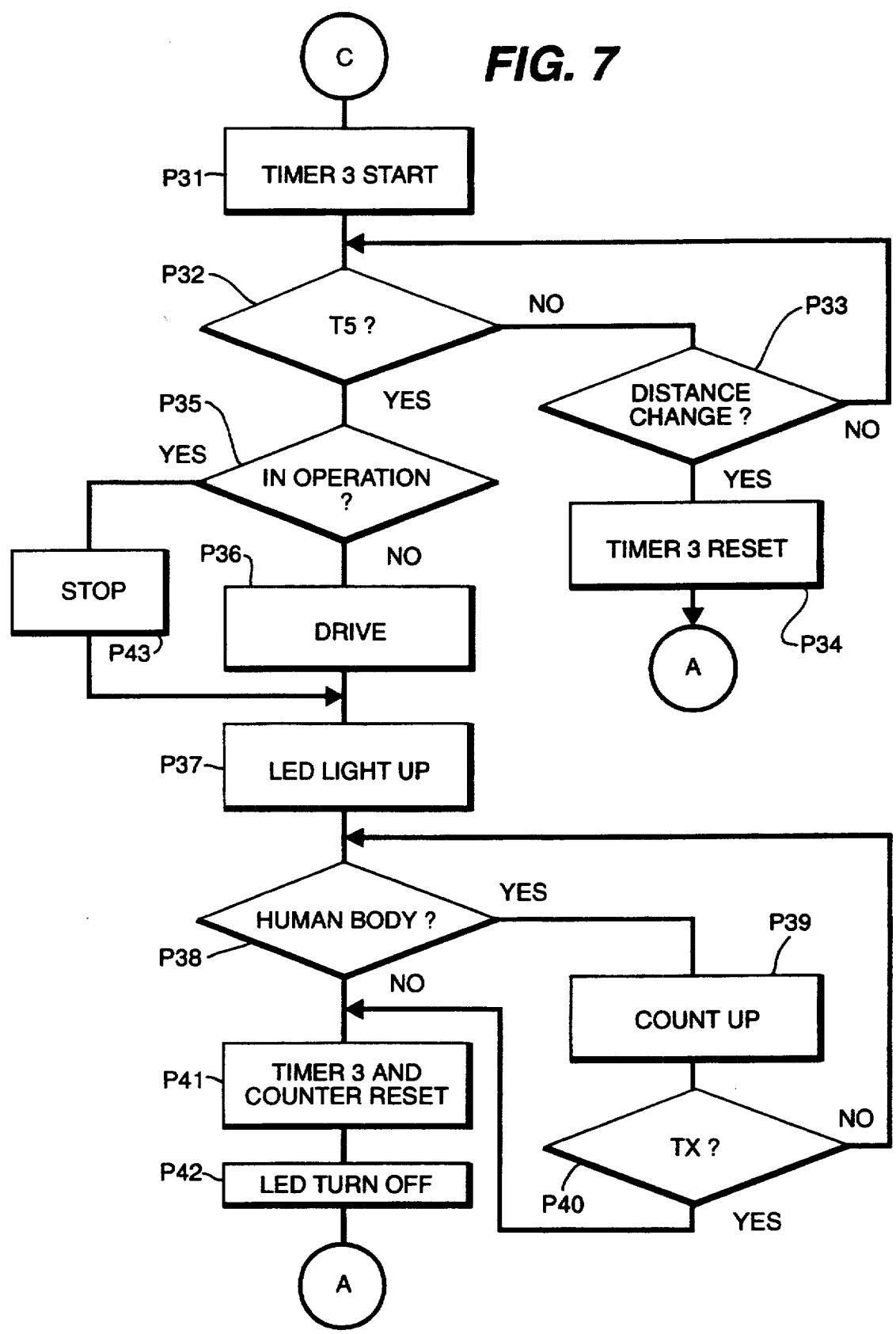
Figure 11:
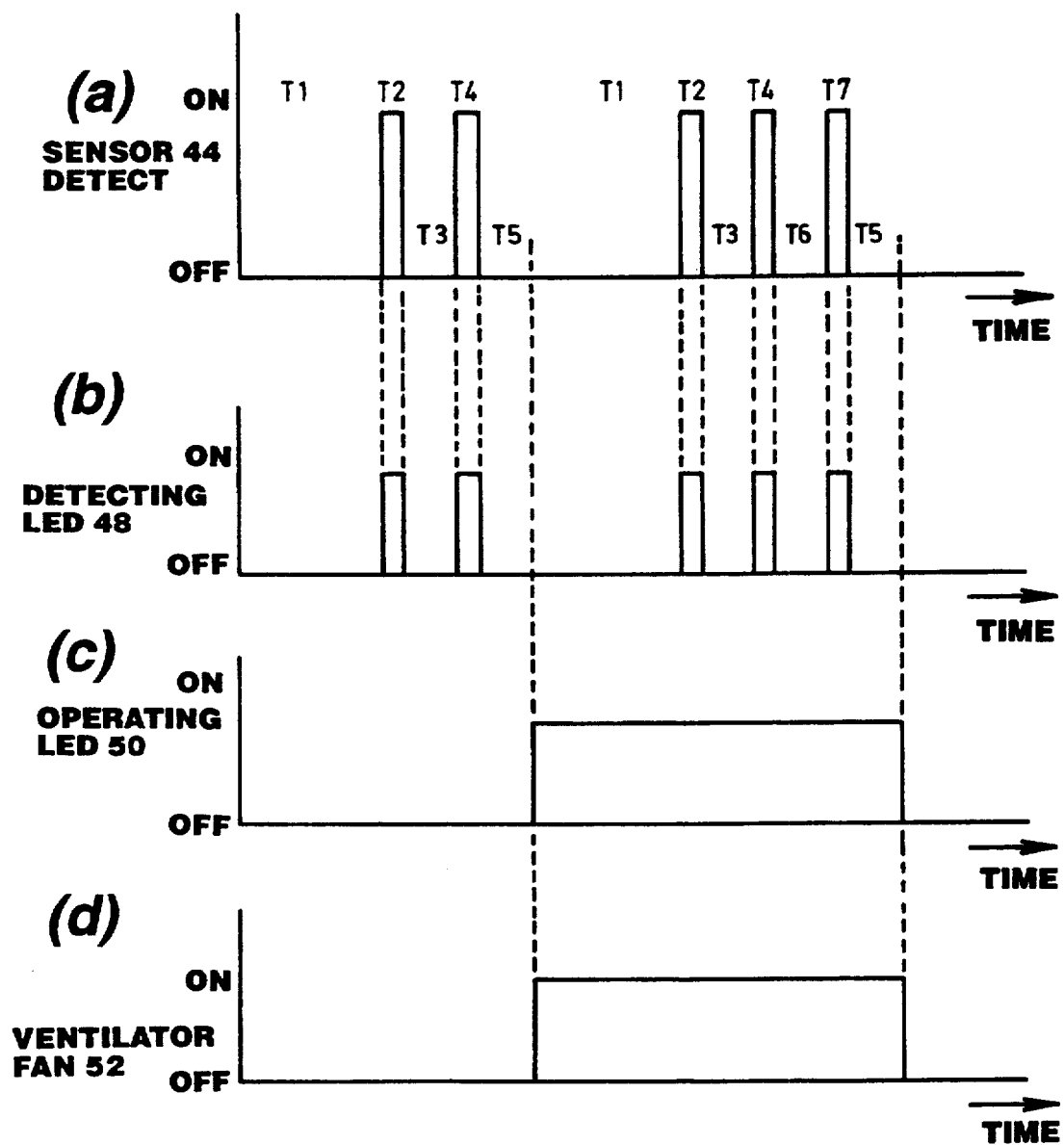
FIG. 11 is a timing chart explaining operation of the second embodiment of this invention.
Figure 12A:
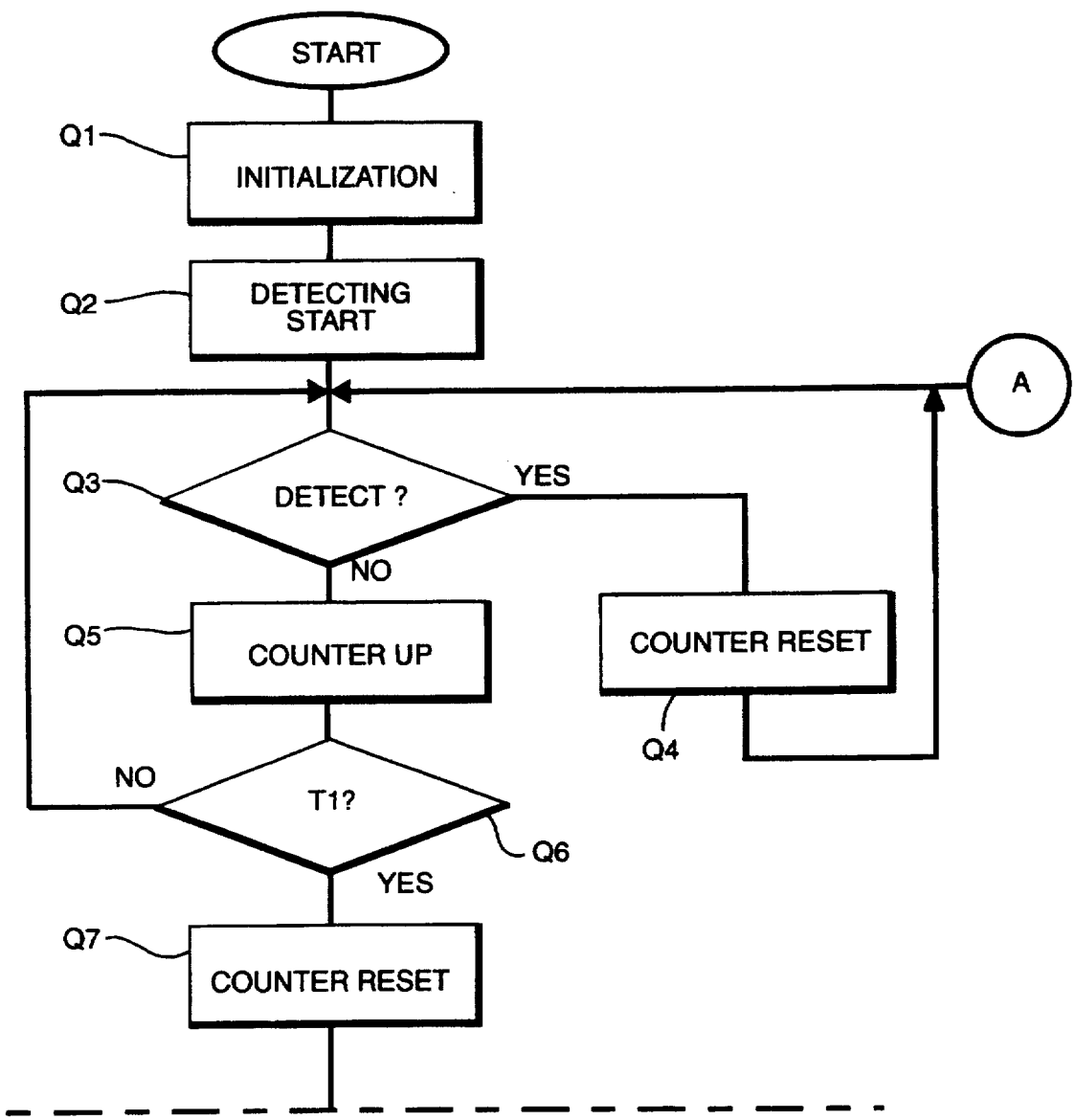
FIG. 12, FIG. 13, FIG. 14, and FIG. 15 are flow charts showing the operation of the second embodiment of this invention.
Figure 12B:
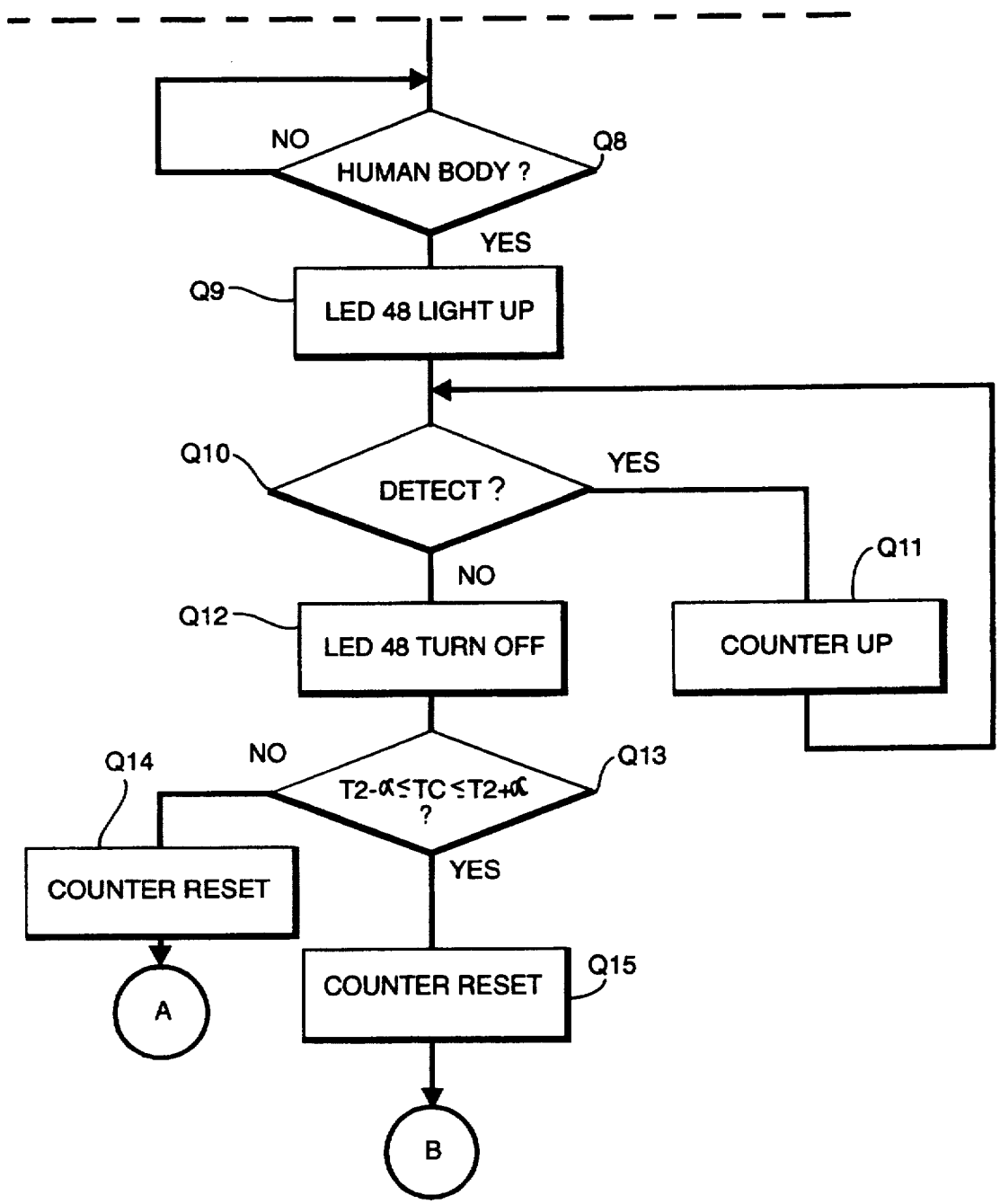
Figure 13:
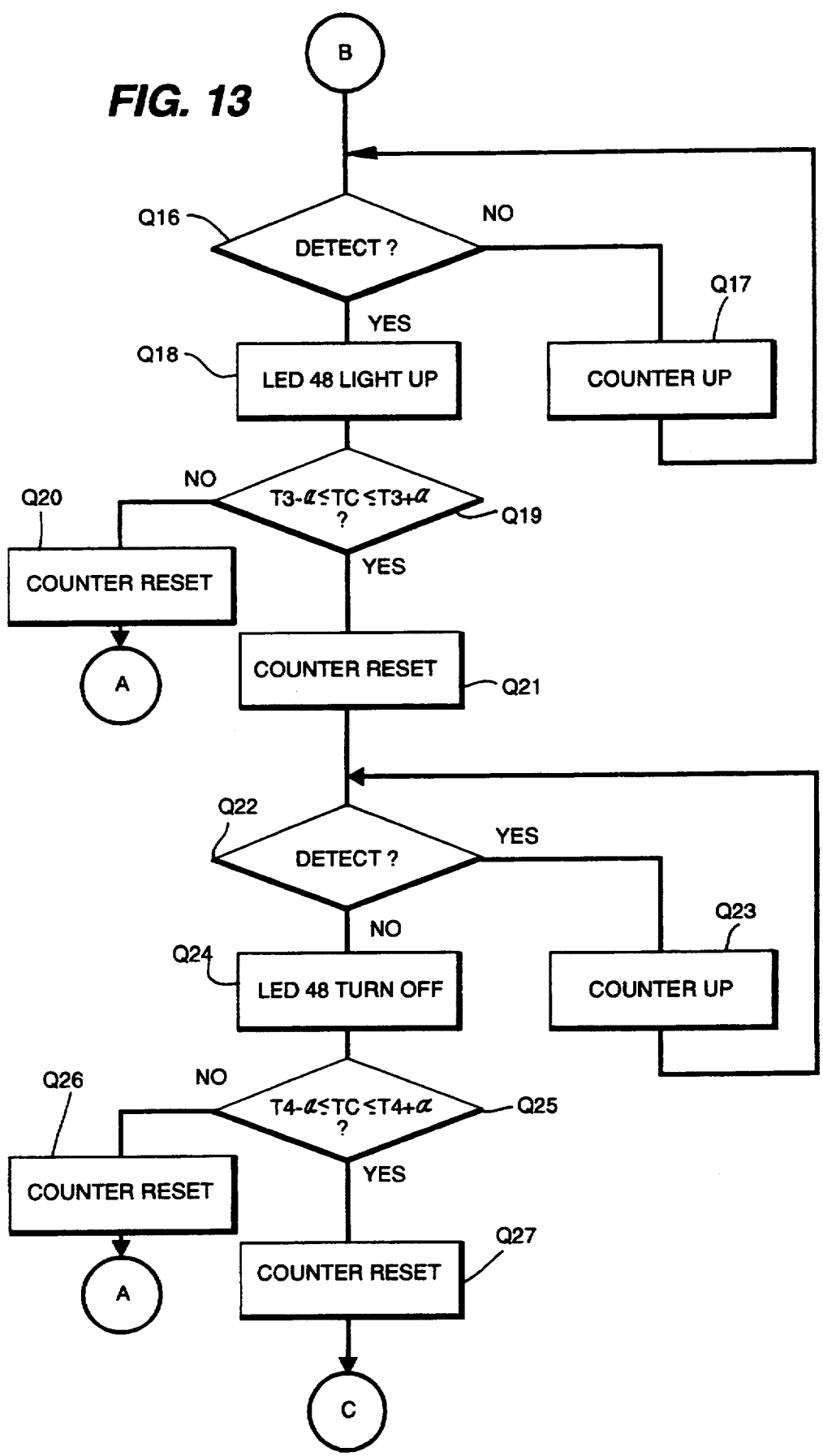
Figure 14:
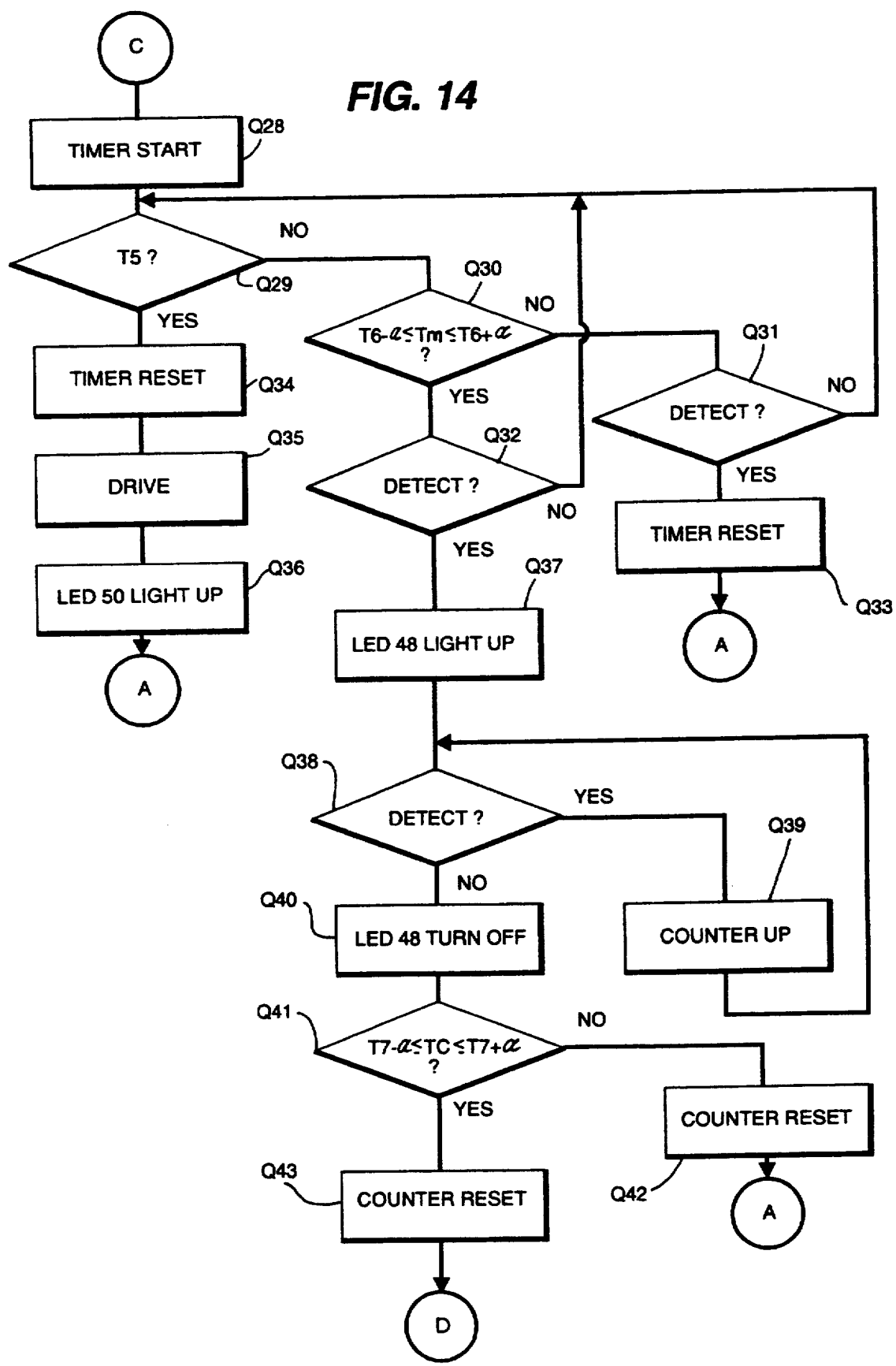
Figure 15:
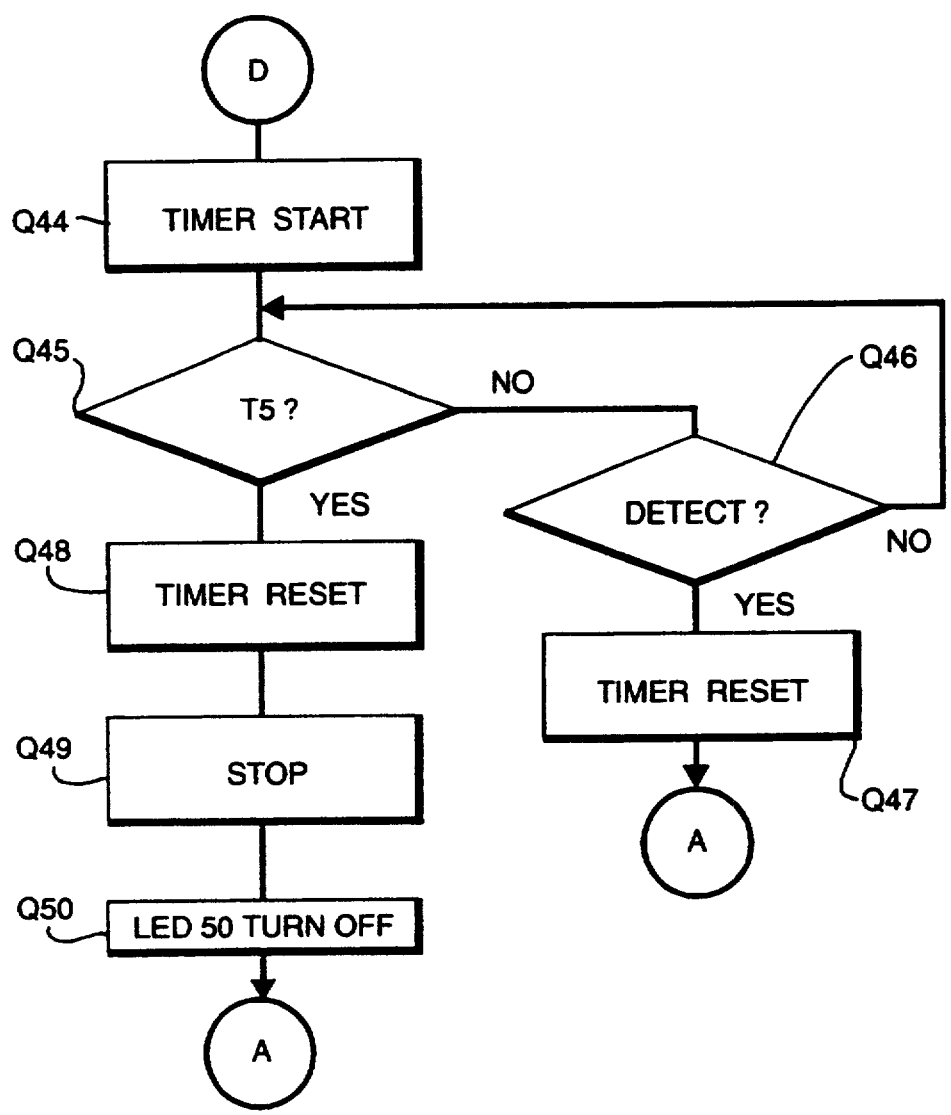
Figure 16:
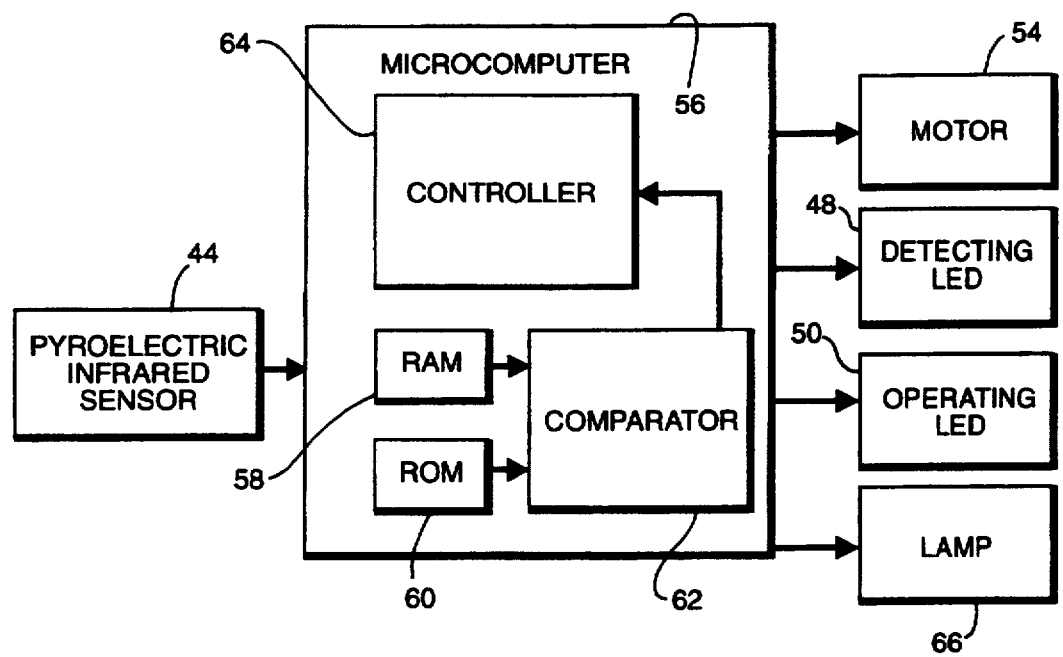
FIG. 16 is a block diagram showing an electrical structure of a third embodiment of this invention.
Figure 20:
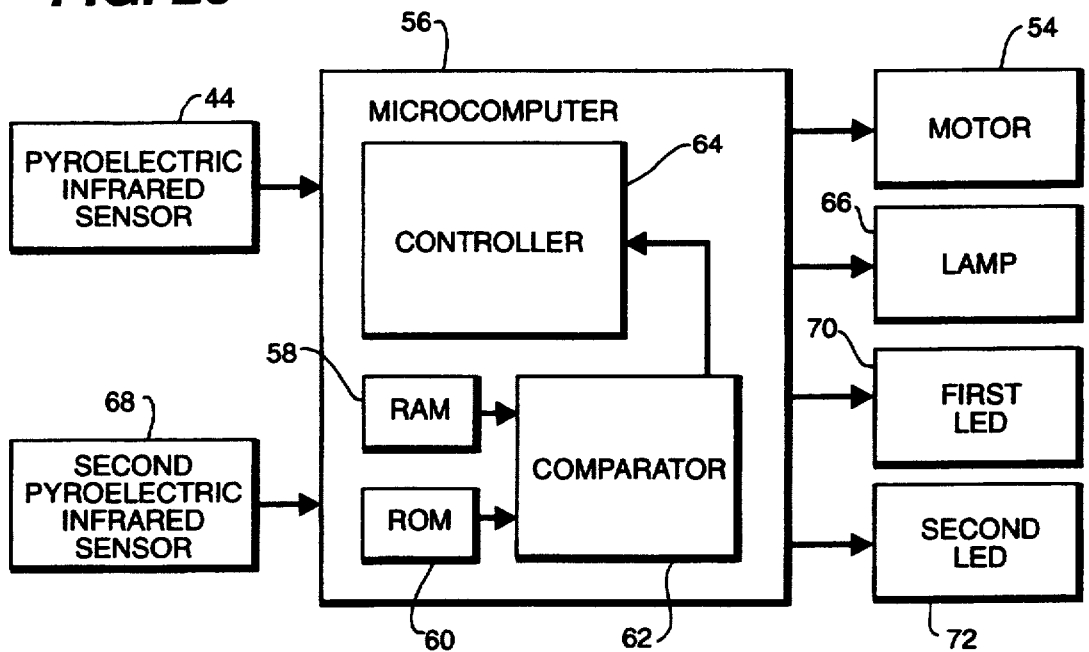
FIG. 20 is a block diagram showing an electrical structure of a fourth embodiment of this invention.
Figure 17:
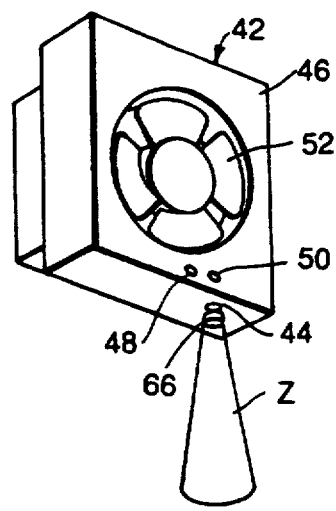
FIG. 17 is a perspective view of a ventilator according to a third embodiment of this invention.
Figure 18:
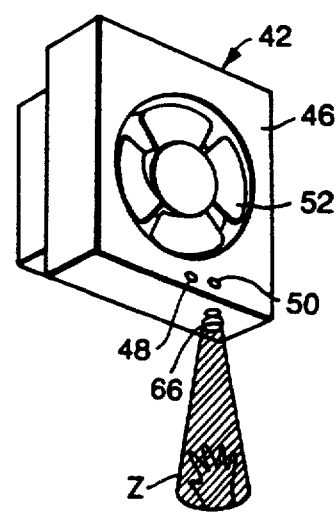
FIG. 18 is a diagram showing how a human interacts with the third embodiment of this invention.
Figure 21:
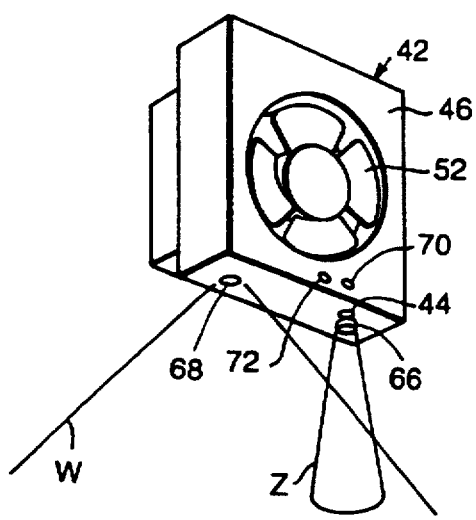
FIG. 21 is a perspective view of a ventilator in accordance with the fourth embodiment of this invention.
Figure 22:
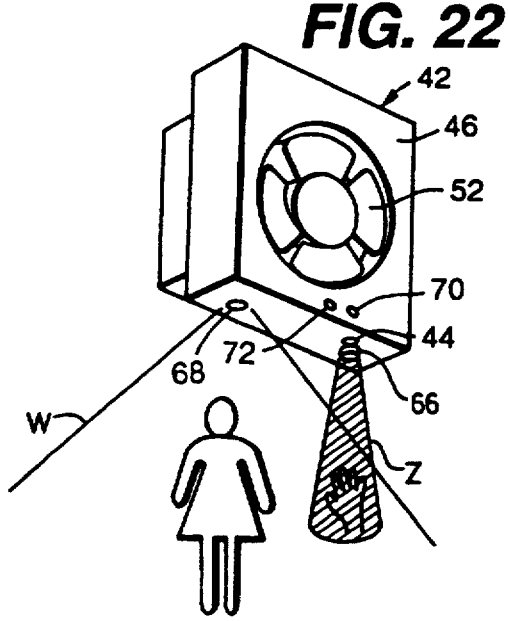
FIG. 22 is a diagram showing how a human interacts with the fourth embodiment of this invention.
Figure 23:
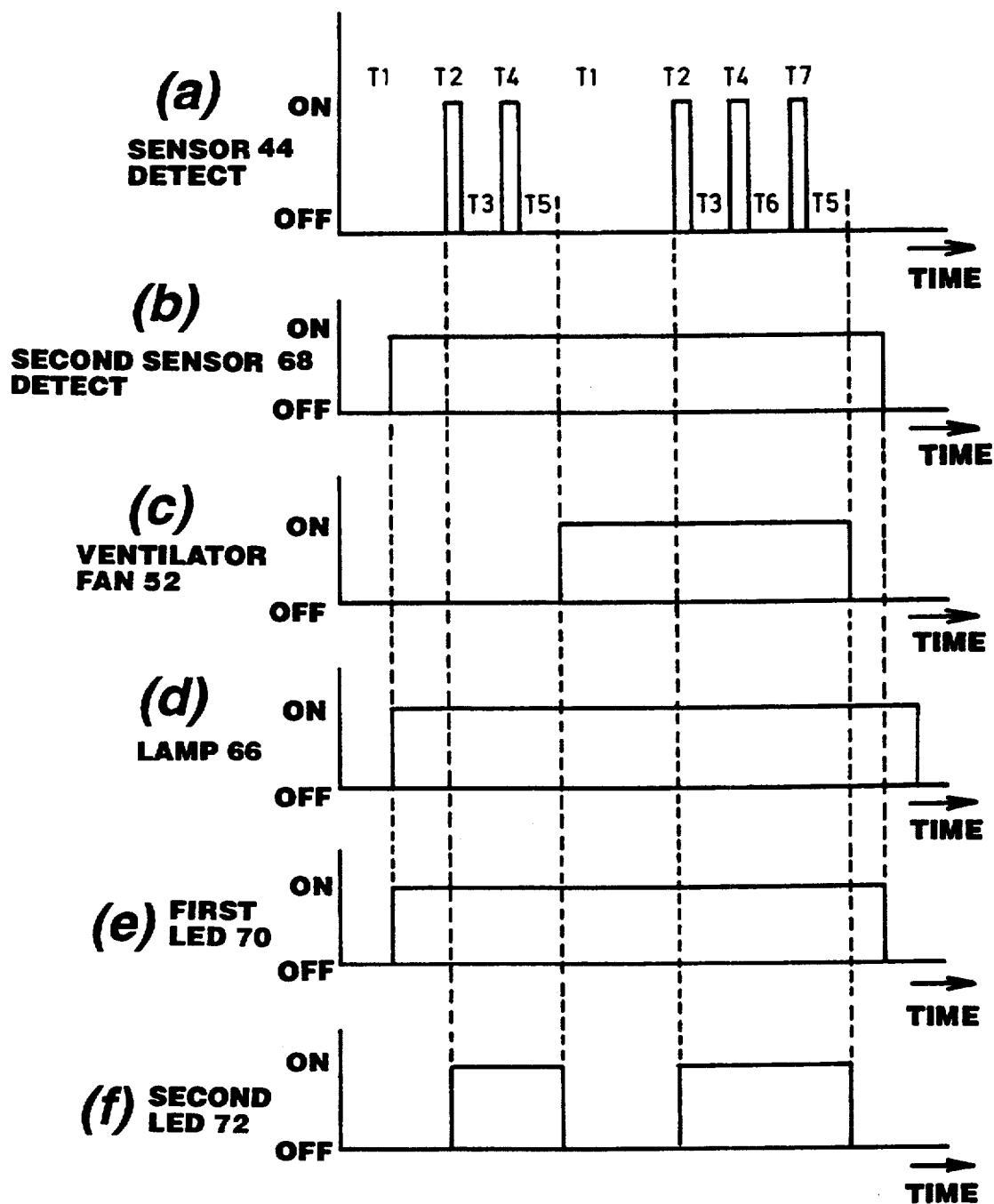
FIG. 23 is a timing chart explaining operation of the fourth embodiment of this invention.

Operation of the first embodiment will be further described with reference to the flowchart FIGS. 5-7. When electric power is first supplied, the microcomputer 32 performs an initialization (step P1) which is well known and will not be further described. Counters of timer 1, timer 2, and timer 3 are reset. The microcomputer 32 sends a signal causing the ultrasonic transmitter 26 to begin a regular transmitting operation (step P2). The ultrasonic transmitter 26 transmits an ultrasonic wave, the ultrasonic wave is reflected by a human body or an object. The ultrasonic receiver 28 receives the reflected ultrasonic wave, and the reception signal is sent to the microcomputer 32. The microcomputer 32 calculates a reflection time of the reflected ultrasonic wave based on the reception signal, and interprets reflection time as distance information.

Figure 3:
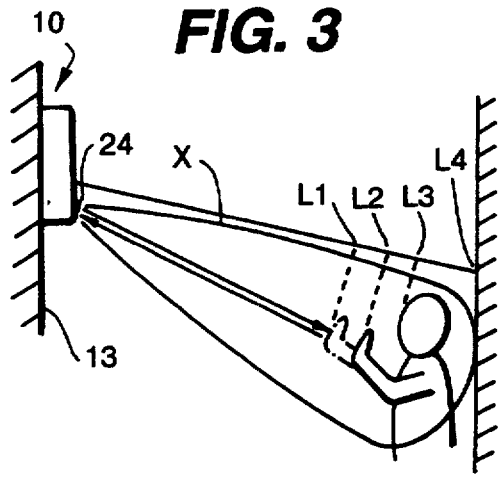
FIG. 3 is an explanatory diagram showing how a human moves to control the first embodiment of this invention.

The ultrasonic sensor 24 has a detecting area X as shown in FIG. 3. When the distance information based on the reception signal of the ultrasonic receiver 28 is less than L3 as shown in FIG. 4, the microcomputer 32 determines that a human body is present in the detecting area X.

Figure 4:
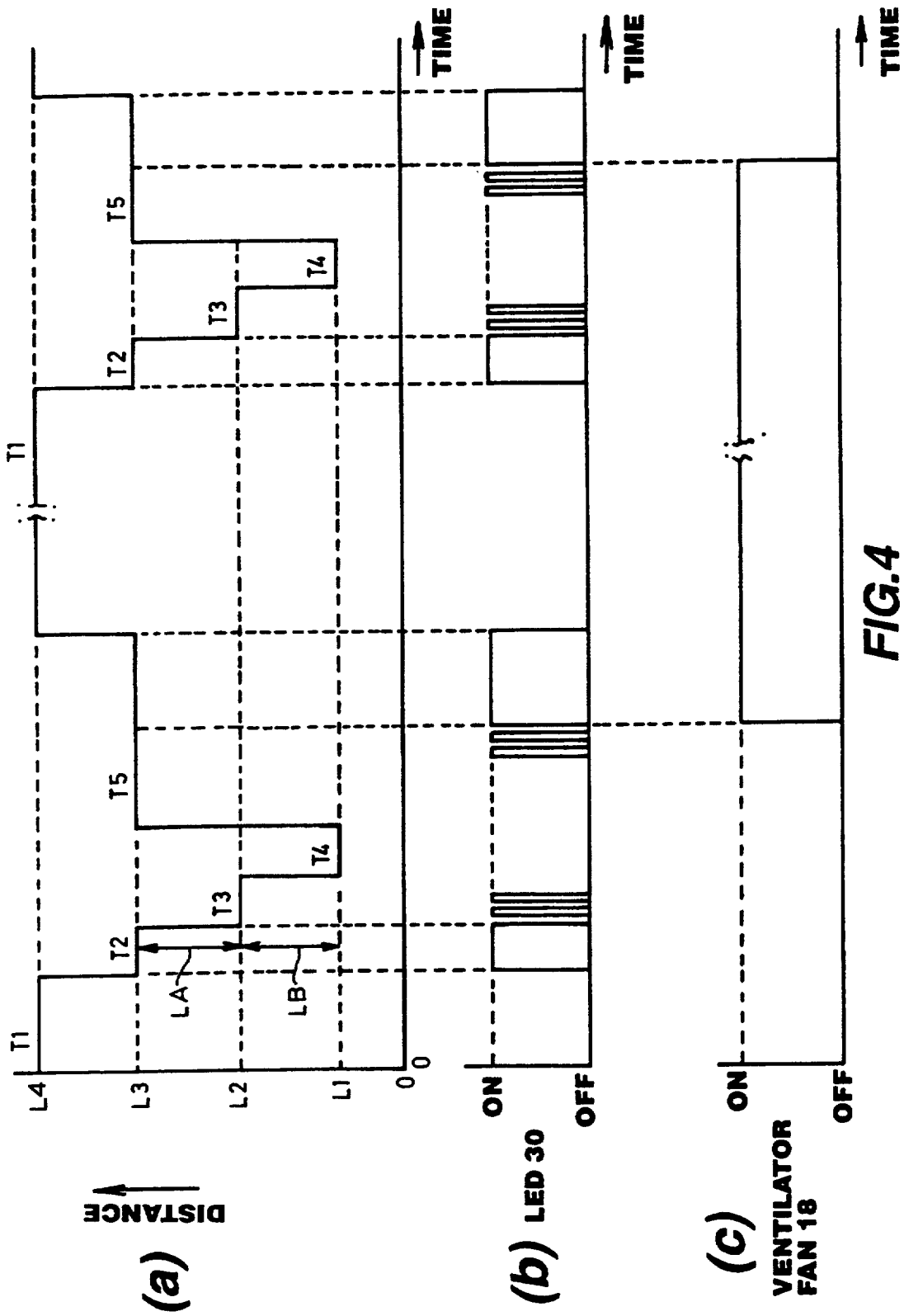
FIG. 4 is a timing chart explaining operation of the first embodiment of this invention.

In this case, if a wall or other object is located nearby, for example at distance L4 from ultrasonic receiver 28, the microcomputer 32 receives, for example, the distance information L4 as shown in FIG. 4, so that the microcomputer 32 determines that the object is present.

The flow proceeds to a next step P3 "OBJECT PRESENT?". If the microcomputer 32 determines that an object "YES" at this step P3, flow proceeds to a next step P4 "TIMER 1 IN OPERATION?". In the step P4, initially microcomputer 32 determines "NO", and progress as to the next step. The timer 1 starts (step P5), then the timer 2 is reset (step P6). The microcomputer 32 determines whether a time Tm1 of the timer 1 exceeds a predetermined time T1 (step P7). The microcomputer 32 initially determines "NO" at the step P7, the flow returns back to the step P3. On the other hand, when the microcomputer 32 determines "YES" at the step P4, the flow jumps to the step P7.

The steps from P3 to P7 are used to ascertain that the state of circumstances around the ultrasonic sensor 24 is stable, i.e, the ultrasonic sensor 24 is constantly receiving an ultrasonic wave reflected from the wall or the other subject, before carrying out the detection operation as described below.

When the wall or other object is far distant from the ventilator 10, the ultrasonic receiver 28 does not output a reception signal. In this case, the microcomputer 32 determines "NO" at the step P3, and flow progresses to step P9. At the step P9 the microcomputer 32 determines whether the timer 2 is operating or not. The microcomputer 32 initially determines "NO" at the step P9, and the timer 2 starts (step P10). The timer 1 is reset (step P11). The microcomputer 32 initially determines "NO" at the step P9, and the timer 2 starts (step P10). The timer 1 is reset (step P11). The microcomputer 32 determines whether a time Tm2 of the timer exceeds T1 (step P12). At the step P12, in the case of "NO", the flow returns back to the step P3, and repeats the step P3, P9, and P12.

That is, the steps from P3 to P12 are used to ascertain that the state of circumstances around the ultrasonic sensor 24 is stable, i.e., ultrasonic sensor 24 is not constantly receiving the ultrasonic wave reflected from the wall or the other object.

At a step PS, the timer 1 and timer 2 are reset. At a next step P9, the microcomputer 32 determines whether a human body is present or not. That is, at the step P9, the microcomputer 32 determines whether the distance information from the ultrasonic receiver 28 is less than L3 or not. At the step P13, in the case of "NO", the flow repeats the step P13.

When a user enters within the detecting area X as shown in FIG. 3, the microcomputer 32 determines "YES" at the step P13. The microcomputer 32 continuously outputs a drive signal to the LED 30 to cause the LED 30 to light up continuously (as shown in FIG. 4(b)).

The flow progresses to step P15, the microcomputer 32 determines whether the distance information from the ultrasonic receiver 28 becomes smaller by a distance of LA from the distance information at the step P13. In the case of "NO" at the step P15, the microcomputer 32 increases a counter by one count (step P16) then returns to the step P15. The microcomputer 32 increments the counter by one each time steps P15 and P16 are repeated. As a result, the count value of the counter becomes indicative of a period from a point when the user enters into the detecting area X to a point when a user carries out a next action.

As shown in FIG. 3, when the user raises his hand, the distance information from the ultrasonic receiver 28 becomes L2, which is less than L3 by a distance of LA. The microcomputer 32 determines "YES" at the step P15, the microcomputer 32 intermittently outputs a drive signal to the LED 30 so as to cause the LED 30 to flash (step P17) (as shown in FIG. 4(b)).

The microcomputer 32 determines whether a count value TC of the counter, corresponding to a period of the action of the raising of the user's hand, exceeds T2-α and is less than T2+α in a step P18.

In the case of "NO" at the step P18, the counter is reset (step P19), and returns to the step P3. In the case of "YES" at the step P3 and when there is a "YES" at the step P18, the counter is reset (step P20), and the flow progresses to step P21. At the step P21, the microcomputer 32 determines whether the distance information from the ultrasonic receiver 28 becomes L1, which is less than L2 by a distance of LB. The microcomputer 32 determines "NO" at the step P21, the microcomputer 32 increments a counter by one count (step P22), then the flow returns to the step S21. The microcomputer 32 increments the count value of the counter by one each time steps P21 and P22 are repeated. As a result, the count value of the counter becomes indicative of a period from a point when the user raises his hand to a point when a user carries out a next action.

As shown in FIG. 3, when the user extends his arm forward, the distance information from the ultrasonic receiver 28 becomes L1, which is less than L2 by a distance of LB. So, the microcomputer 32 determines "YES" at the step P21. In a next step P23, the microcomputer 32 determines whether a count value Tc of the counter, corresponding to a period of the action of the extending of the user's hand exceeds T3-α. In the case of "NO" at the step P23, the counter is reset (step P23), and the flow returns to the step P3.

In the case of "YES" at the step P23, the counter is reset (step P25), and the flow progresses to a step P26. At the step P26, the microcomputer 32 determines whether the distance information from the ultrasonic receiver 28 becomes L3, which is the distance information at the step P13. In the case of "NO" at the step P26, the microcomputer 32 increments a counter by one count (step P27), then returns to the step P26. The microcomputer 32 increments the count value of the counter by one each time steps P26 and P27 are repeated. As a result, the count value of the counter becomes indicative of a period from a point when the user extends his arm to a point when a user carries out the next action.

When the user lowers the extended arm, the distance information from the ultrasonic receiver 28 becomes L3, which is bigger than the L1 by a distance of LA+LB. So, the microcomputer 32 determines "YES"

at the step P26. In a next step P28, the microcomputer 32 determines whether a count value Tc of the counter, corresponding to a period of the action of the lowering of the user's arm exceeds T4-α and is less than T4+α. In the case of "NO" at the step P28, the counter is reset (step P29), and the flow returns to the step P3.

In the case of "YES" at the step P28, the counter is reset (step P30), and the flow progresses to a step P31. At the step P31, the timer 3 starts to count. The microcomputer 32 determines whether a count value Tm3 of the timer 3 becomes T5 (step P32). In the case of "NO" at the step P32, the flow progresses a next step P33. At the step P33, the microcomputer 32 determines whether the distance information from the ultrasonic receiver 28 is changed. In the case of "NO" at the step P33, the flow returns to the step P32. When the user has some action within the period of T5, the microcomputer 32 determines "YES" at the step P33, and the timer 3 is reset (step P34), then the flow returns to the step P3.

When the user remains stationary for the period T5, the microcomputer 32 determines "YES" at the step P32, and flow progresses to a next step P35. At the step P35, the microcomputer 32 determines whether the ventilator fan 18 is in operation.

Firstly, the microcomputer 32 determines "NO" at the step P35, the microcomputer 32 outputs a drive signal to the motor 20 to rotate the ventilator fan 18 in a step P36 (as shown in FIG. 4(c)). The microcomputer 32 continuously outputs a drive signal to the LED 30 to light up continuously (step P37). The microcomputer 32 determines whether there is a human body in the detecting area X (step P38). In the case of "YES" at the step P38, the microcomputer 32 increments the counter (step P39). The microcomputer 32 determines whether a count Tc of the counter exceeds TX (step P40). In the case of "NO" at the step P40, the flow returns to the step P38. That is, the count value of the counter from the step P38 to the step P40 becomes indicative of the period from a point when the ventilator fan 18 begins to rotate. In the case of "NO" at the step P38, or in the case of "YES" at the step P40, the timer 3 and the counter are reset (step 41). The microcomputer 32 stops the output of the driving signal to the LED 30 to turn off the LED (step P42), then the flow returns to the step P3.

When the user enters into the detecting area X of the ultrasonic sensor 24 again, and performs action as described above, the microcomputer 32 performs the same operations as described above until it reaches the step P35. At the step P35, since the ventilator fan 18 is in operation, the microcomputer 32 determines "YES". The flow progresses to a next step P43, the microcomputer 32 outputs a stop signal to the motor 20 of the ventilator fan 18 to stop the rotation of the ventilator fan.

After the step P43, the flow progresses to the next step P37 as described above.

Multiple signal patterns such as those shown in FIG. 4(a) are stored in the ROM 36 of the microcomputer 32 in advance. A rotational speed of the motor 20, for example, is determined on the basis of the signal pattern. Therefore, the microcomputer 32 can control the airflow of the ventilator fan 18.

Thus, in this embodiment, the ventilator 10 has the ultrasonic sensor 24. When the comparator 38 determines that the output signal pattern from the ultrasonic sensor 24 matches a signal pattern stored in the ROM 36, for example, as shown in FIG. 4(a), the controller 40 of the microcomputer 32 controls the actuation of the ventilator fan 18, for example, activating and deactivating.

This embodiment has an operational advantage in that the user's hand is not soiled by contact with a switch, and the user can control the ventilator 10. By eliminating the need for a wall switch it is easy to change the layout of a room having a ventilator.

Using this invention, a user can activate and deactivate ventilator 10. All the user needs to do is to enter the detection area X and move his hand according to a specific pattern.

When the user enters in the detection area X, the microcomputer 32 continuously lights LED 30 based on the signal from the ultrasonic sensor 24. As a result, the user can ascertain, by sight, that he has entered into the detection area X.

When the user moves his hand according to the specific pattern while in the detection area X, the microcomputer 32 flashes the LED 30 based on the signal from the ultrasonic sensor 24. As a result, the user can ascertain, by sight, that the ultrasonic sensor 24 is reading the pattern of the movement. It is very convenient in terms of use.

Moreover, the LED 30 can indicate the detection or non-detection of the human body, and the state of movement of the human body respectively. Therefore, the user can ascertain visually from a single LED 30 whether the ultrasonic sensor 24 detects the presence or absence of the human body, and the state of the motion of the human body.

Figure 10:
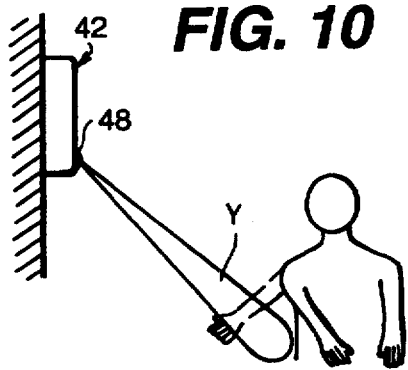
FIG. 10 is an explanatory diagram showing how a human moves to control the second embodiment of this invention.

FIG. 8 to FIG. 15 show the second embodiment of this invention. In this embodiment, ventilator 42 has a pyroelectric infrared sensor 44 to detect a human body. The sensor is mounted on a case 46 of the ventilator 42. The pyroelectric infrared sensor 44 can detect thermal energy radiated from the human body within a detection area Y as shown in FIG. 10. A detecting LED 48, indicating a presence or absence of a human body in the detecting area Y, is located on the case 46. An operation LED 50 which shows an operation of the pyroelectric infrared sensor 44 is adjacent to the detecting LED 48. A ventilator fan 52 and a motor 54 connected to the ventilator fan are located in an opening of case 46.

A microcomputer 56 includes a RAM 58, a ROM 60, a comparator 62, and a controller 64. The ROM 60 stores a program, data, based on which the ventilator fan 52 is controlled, and multiple signal patterns, which correspond to specific motions of the ventilation fan. The pyroelectric infrared sensor 44 is connected to an input port of the microcomputer 56. Data which the pyroelectric sensor 44 receives are sent to the RAM 58 through the input port. The data stored in the RAM 58 and the signal patterns stored in the ROM 60 are sent to the comparator 62. The comparator 62 compares the data with the signal pattern, and information based on the comparison is sent to the controller 64. The motor 54, the detecting LED 48, and the operating LED 50 are also connected to the microcomputer 56 respectively, and are controlled by the controller 64 based on the comparison information.

An operation will be described with reference to the flowchart FIGS. 12–15 also. When electric power is supplied, the microcomputer 56 performs a known initialization (step 21) and resets a counter and a timer. The pyroelectric infrared sensor 44 starts to detect an object (step Q2). The microcomputer 56 determines whether an output signal from the pyroelectric infrared sensor 44 is present, that is, whether the pyroelectric infrared sensor 44 detects the object (step Q3). In the case of "YES" at the step Q3, the microcomputer 56 resets the counter (step Q4), and the flow returns back to the step Q3. In the case of "NO" at the step Q3, the microcomputer 56 increases the counter by one (step Q5). The microcomputer 56 determines whether a time Tc of the value of the counter reaches a predetermined T1 at the step Q6. In the case of "NO" at the step Q6, the flow returns back to the step Q3, and in the case of "YES," the microcomputer 56 resets the counter (step Q7).

After the step Q7, the microcomputer 56 determines whether the pyroelectric infrared sensor 44 detects a human body (step Q8). When the pyroelectric infrared sensor 44 detects the human body, the microcomputer 56 outputs a drive signal to the detecting LED 48 to light up the detecting LED (step Q9). For example, when the user waves his hand across the detection area Y as shown in FIG. 10, the microcomputer 56 detects the signal from the pyroelectric infrared sensor 44. The microcomputer 56 determines whether the pyroelectric infrared sensor 44 detects the human body again (step Q10). In the case of "YES" at the step Q10, the microcomputer 56 counts the period when the pyroelectric infrared sensor 44 detects the human body. That is, the microcomputer 56 counts the period when the user's hand moves across the detection area Y.

In the case of "NO" at the step Q10, the microcomputer 56 outputs a turn off signal to the detecting LED 48 to turn off the detecting LED. The microcomputer 56 determines whether the time Tc of the counter exceeds T2-$\alpha$ and is less than T2+$\alpha$ at the step Q13. In the case of "NO" at the step Q13, the microcomputer 56 resets the counter (step Q14) and the flow returns back to the step Q3. In the case of "YES" at the step Q13, the microcomputer 56 resets the counter (step Q15). The microcomputer 56 determines whether the pyroelectric infrared sensor 44 detects the human body (step Q16). In the case of "NO" at the step Q16, the microcomputer 56 increments the counter by one (step Q17), and the flow returns back to the step Q16.

As a result, in the step Q16 and the step Q17, the microcomputer 56 counts the period when the pyroelectric infrared sensor 44 does not detect the human body.

In the case of "YES" at the step Q16, the microcomputer 56 outputs a drive signal to the detecting LED 48 to light up the detecting LED (step Q18). The microcomputer 56 determines whether the time Tc of the counter exceeds T3-$\alpha$ and is less than T3+$\alpha$ at a step Q19. In the case of "NO" at the step Q19, the microcomputer 56 resets the counter (step Q20), and the flow returns back to the step Q3. In the case of "YES" at the step Q19, the microcomputer 56 resets the counter (step Q21). The microcomputer 56 determines whether the pyroelectric infrared sensor 44 detects the human body (step Q22). In the case of "YES" at the step Q22, the microcomputer 56 increments the counter by one (step Q23), and the flow returns back to the step Q22.

In the case of "NO" at the step Q22, the microcomputer 56 outputs a turn off signal to the detecting LED 48 to turn off the detecting LED (step Q24). The microcomputer 56 determines whether the time Tc of the counter exceeds T4-$\alpha$ and is less than T4+$\alpha$ at a step Q25. In the case of "NO" at the step Q25, the microcomputer 56 resets the counter (step Q26), and the flow returns back to the step Q3. In the case of "YES" at the step Q25, the microcomputer 56 resets the counter (step Q27).

A timer starts a timing operation at a step Q28. The microcomputer 56 determines whether a timing period Tm of the timer reaches a predetermined value T5 at a step Q29. In the case of "NO" at the step Q29, the flow progresses a next step Q30. At the step Q30, the microcomputer 56 determines whether the timing period Tm of the timer exceeds T6-$\alpha$. In the case of "NO" at the step Q30, the microcomputer 56 determines whether the pyroelectric infrared sensor 44 detects the human body (step Q31). In the case of "NO" at the step Q31, the flow returns back to the step Q29. In the case of "YES" at the step Q31, the microcomputer 56 resets the timer, and the flow returns back to the step Q3.

In the case of "YES" at the step Q29, the microcomputer 56 resets the timer (step Q34). The microcomputer 56 outputs a drive signal to the motor 54 to rotate the ventilator fan 52 (step Q35). The microcomputer 56 outputs a drive signal to the operating LED 50 to light up the operating LED (step Q36). After that, the flow returns back to the step Q3.

Thus, when the user waves his hand only twice across the detecting area Y of the pyroelectric infrared sensor 44, the ventilator fan 52 starts the operation according to the time information T1 to T5.

The deactivation of the ventilator fan 52 will be described as follows. The steps from Q1 to Q31 are as same as the steps in the case of the activation of the ventilator fan 52. While the flow is repeating the step Q29, Q30, and Q31, when the user waves his hand across the detection area Y (a third time), the microcomputer 56 determines "YES" at the step Q30, and the microcomputer 56 outputs a drive signal to the detecting LED 48 to light up the detecting LED (step Q37).

Steps Q38 to Q43 operate substantially the same steps as the steps Q9 to Q15 described above. However, at the step Q41, the microcomputer 56 determines whether the period Tc of the count value of the counter is such that T7−$\alpha$≦Tc≦T7+$\alpha$.

After the step Q43, the timer starts a timing operation (step Q44). The microcomputer 56 determines whether a timing period Tm of the timer reaches a predetermined T5 at a step Q45. In the case of "NO" at the step at Q45, the flow progresses a next step Q46. At the step Q46, the microcomputer 56 determines whether the pyroelectric infrared sensor 44 detects the human body. In the case of "NO" at the step Q46, the flow returns back to the step Q45. In the case of "YES" at the step Q46, the microcomputer 56 resets the timer, and flow returns back to the step Q3.

In the case of "YES" at the step Q45, the microcomputer 56 resets the timer (step Q48). The microcomputer 56 outputs a turn off signal to the motor 54 to stop the rotation of the ventilator fan 52 (step Q49). The microcomputer 56 outputs a turn off signal to the operating LED 50 to turn off the operating LED (step Q50). After that, the flow returns back to the step Q3. The predetermined value T5 is set longer than the predetermined value T6.

According to the second embodiment, there are both of the detecting LED 48 and the operating LED 50. As a result, the user more quickly ascertains visually whether the pyroelectric infrared sensor 44 detects the presence or absence of the human body, and the state of the motion of the human body.

FIG. 16 to FIG. 19 show the third embodiment of this invention. Corresponding reference numerals represent like or corresponding parts in the second embodiment described above.

The pyroelectric infrared sensor 44 is located on the underside of the case 46. The pyroelectric infrared sensor 44 has a detecting area Z. The lamp 66 is connected to an output port of the microcomputer 56.

At the step of Q9, the microcomputer 56 outputs a drive signal to the lamp 66 to light up the lamp. The lamp 66 indicates the range of the detection area Z of the pyroelectric infrared sensor 44 with a visible beam. As a result, the user can easily ascertain whether his hand is in the detection area Z of the pyroelectric infrared sensor 44.

At the step Q36 and Q50, the microcomputer 56 outputs a turn off signal to the lamp 66 to turn off the lamp.

According to the third embodiment, the user can visually ascertain the detection area Z of the pyroelectric infrared sensor 44. It is extremely convenient in terms of use.

Moreover, since the lamp 66 is actuated based on the signal from the pyroelectric infrared sensor 44, it never operates unnecessarily. Therefore, electricity saving can be expected.

FIG. 20 to FIG. 23 show the fourth embodiment of this invention. The same symbols are applied to those parts which are the same as in the third embodiment described above.

A second pyroelectric infrared sensor 68 is located on the underside of the case 46. The second pyroelectric infrared sensor 68 has a detecting area W which is much wider than that of the pyroelectric infrared sensor 44. A first LED 70 which generates green light, and a second LED 72 which generates red light, are located, as indicators at the bottom of the front face of the case 46. The second pyroelectric infrared sensor 68 is connected to an input port of the microcomputer 56. The first LED 70 and the second LED 72 are connected to an output port of the microcomputer 56.

When the second pyroelectric infrared sensor 68 detects a human body, the microcomputer 56 outputs a drive signal to the first LED 70 to light up the first LED based on the signal from the second pyroelectric infrared sensor. When the second pyroelectric infrared sensor 68 does not detect the human body, the microcomputer 56 outputs a turn off signal to the first LED 70 to turn off the first LED based on the signal from the second pyroelectric infrared sensor.

For the period from the step Q9 to the step Q24, and for the period from the step Q9 to the step Q40, the microcomputer 56 outputs a drive signal to the second LED 72 to light up the second LED.

Moreover, this invention is not limited to the embodiments described above, those having ordinary skill in the art will certainly understand that many modifications are possible in the preferred embodiment without departing from the teaching thereof.

All such modifications, for example, a reflective photo-sensor could be used as the human body detection device, are intended to be encompassed within the following claims.

What is claimed is:

1. A ventilator, comprising:
   a) a ventilator fan;
   b) detecting means for detecting a plurality of predetermined control positions of a human body without contact and for forming a control pattern based thereon;
   c) a memory including a plurality of signal patterns stored therein, each pattern corresponding to a specific motion of the ventilator fan;
   d) comparing means for comparing the control pattern with the signal patterns stored in the memory and for determining which signal pattern corresponds thereto; and
   e) control means for controlling the ventilator fan on the basis of the determination of the comparing means.

2. A ventilator according to claim 1, wherein the detecting means includes a pyroelectric infrared sensor.

3. A ventilator according to claim 1, wherein the specific motion of the ventilation fan includes a start mode and a stop mode.

4. A ventilator according to claim 1, wherein the detecting means includes a sensor which can detect a position of the human body.

5. A ventilator according to claim 4, wherein the detecting means includes an ultrasonic sensor.

6. A ventilator according to claim 1, further including display means for displaying presence or absence of the human body.

7. A ventilator according to claim 6, wherein the display means displays a state of the motion of the human body.

8. A ventilator according to claim 6, wherein the display means includes at least two displays for a presence or absence of the human body and for a position of the human body respectively.

9. A ventilator according to claim 1, further including visualizing means for visually indicating whether the human body is within a range that is detectable by said detecting means.

10. A ventilator according to claim 9, wherein the control means actuates the visualizing means based on the human body motion detected by the detecting means.

11. A ventilator, comprising:
   a) A ventilator fan;
   b) an ultrasonic sensor for detecting a plurality of predetermined control positions of a human body without contact and for forming a control pattern based thereon;
   c) a memory including a plurality signal patterns, each pattern corresponding to a specific motion of the ventilator fan;
   d) a timer for counting the time during which the human body is in one of the plurality of predetermined control positions;
   e) comparing means for comparing the control pattern for each time and each position with the signal patterns stored in the memory and for determining which signal pattern corresponds thereto;
   f) a display for indicating the determination of the comparing means; and
   g) control means for controlling the ventilator fan and the display on the basis of the determination of the comparing means.

12. A ventilator, comprising:
   a) a ventilator fan;
   b) a pyroelectric infrared sensor for detecting a change in predetermined positions of a human body without contact and for forming a control pattern based thereon;

c) a memory including a plurality of signal patterns, each pattern corresponding to a specific motion of the ventilator fan;

d) a timer for counting a first time and a second time, the first time corresponding to when the human body is in motion, the second time corresponding to when the human body is not in motion;

e) comparing means for comparing a pattern including both the first time, the second time, and the control pattern with the signal pattern stored in the memory and for determining which signal pattern corresponds;

f) a detecting display for indicating the determination of the pyroelectric infrared sensor;

g) an operating display for indicating the operation of the ventilator fan; and h) control means for controlling the ventilator fan, the detecting display, and the operating display on the basis of the determination of the comparing means.

13. A ventilator according to claim 12, further including a lamp controlled by the control means to light when the pyroelectric infrared sensor detects the presence of a human body.

14. A ventilator according to claim 12, wherein the second time of the timer corresponds to when the human body is not in the detecting area of the pyroelectric infrared sensor.

15. A ventilator, comprising:

a) a ventilator fan;

b) first detecting means, having a first detecting area, for detecting a first predetermined motion of a human body without contact and for forming a first control pattern based thereon;

c) second detecting means, having a second detecting area, for detecting a second predetermined motion of a human body without contact;

d) a memory including plural signal patterns, each pattern corresponding to a specific motion of the ventilator fan;

e) comparing means for comparing the first control pattern with the signal patterns stored in the memory and determining which signal pattern corresponds thereto;

f) a first display for indicating the determination of the second detecting means;

g) a second display for indicating the operation of the ventilator fan;

h) a lamp projecting light over the first detecting area; and i) control means for controlling the ventilator fan, the first display, the second display, and the lamp, so that when the second detecting means detects the human body, the lamp projects light.

16. A ventilator, comprising:

a) a ventilator fan;

b) a first pyroelectric infrared sensor, having a first detecting area, for detecting a change of a position of a human body without contact;

c) a second pyroelectric infrared sensor, having a second detecting area which is wider than the first detecting area, for detecting a change of a position of a human body without contact;

d) a memory storing plural signal patterns, each pattern corresponding to a specific motion of the ventilator fan;

e) a timer for counting a first time and a second time, the first time corresponding to when the human body is in motion, the second time corresponding to when the human is not in motion;

f) comparing means for comparing a pattern including both the first time, the second time, and the change of the position with the signal pattern stored in the memory and determining which signal pattern corresponds thereto;

g) a first display for indicating the determination of the second pyroelectric infrared sensor;

h) a second display for indicating the operation of the ventilator fan;

i) a lamp projecting light over the first detecting area of the first pyroelectric infrared sensor; and j) control means for controlling the ventilator fan, the first display, the second display, and the lamp, so that when the second pyroelectric infrared sensor detects the human body, the lamp projects light.

* * * * *